(12) United States Patent
Lin

(10) Patent No.: US 9,446,815 B2
(45) Date of Patent: Sep. 20, 2016

(54) CHAIN WHEEL ASSEMBLY AND CHAIN WHEEL DEVICE USING IT

(71) Applicant: VP COMPONENTS CO., LTD., Taichung (TW)

(72) Inventor: Wen-Hwa Lin, Taichung (TW)

(73) Assignee: VP COMPONENTS CO., LTD, Taichung (TW)

( * ) Notice: Subject to any disclaimer, the term of this patent is extended or adjusted under 35 U.S.C. 154(b) by 194 days.

(21) Appl. No.: 14/491,081

(22) Filed: Sep. 19, 2014

(65) Prior Publication Data

US 2016/0083045 A1    Mar. 24, 2016

(51) Int. Cl.
*B62M 9/10*    (2006.01)
*F16H 55/30*   (2006.01)

(52) U.S. Cl.
CPC .............. *B62M 9/10* (2013.01); *F16H 55/30* (2013.01)

(58) Field of Classification Search
CPC .......... B62M 9/10; B62M 9/12; F16H 55/30
USPC ........................................................ 474/160
See application file for complete search history.

(56) References Cited

U.S. PATENT DOCUMENTS

| | | | | |
|---|---|---|---|---|
| 4,392,841 A * | 7/1983 | Juy | .......................... | B62M 9/10 474/156 |
| 5,954,604 A * | 9/1999 | Nakamura | ............... | B62M 9/10 474/158 |
| 2013/0017914 A1 * | 1/2013 | Braedt | ..................... | B62M 9/10 474/160 |
| 2013/0035183 A1 * | 2/2013 | Tokuyama | ............... | B62M 9/12 474/78 |
| 2015/0024884 A1 * | 1/2015 | Braedt | ..................... | B62M 9/10 474/78 |
| 2015/0314641 A1 * | 11/2015 | Koshiyama | .............. | B62M 9/10 301/110.5 |
| 2016/0059931 A1 * | 3/2016 | Fukunaga | ............... | F16H 55/30 474/158 |
| 2016/0114859 A1 * | 4/2016 | Tsai | ........................ | F16H 55/30 474/160 |

FOREIGN PATENT DOCUMENTS

DE    102012006771 A1    10/2013

* cited by examiner

*Primary Examiner* — William E Dondero
*Assistant Examiner* — Robert T Reese
(74) *Attorney, Agent, or Firm* — Muncy, Geissler, Olds & Lowe, P.C.

(57) ABSTRACT

The present invention provides a chain wheel assembly and chain wheel device using it, wherein the chain wheel device includes a driver, a switching sleeve, plural chain wheels with different diameter sizes, plural connectors, and a fastener. Therein, the driver is connected to a wheel hub of a back wheel of a bicycle for transmitting a torque. One end of the switching sleeve is screwed to the driver. The chain wheels, axially stacked from the largest one to the smallest one, are disposed in a direction from the driver toward the switching sleeve, with sprockets disposed on the periphery of each chain wheel, respectively, for optionally engaging chain. The ring-shaped connectors are coupled between each two of the chain wheels, respectively. The fastener is screwed to the other end of the switching sleeve for axially fixing the switching sleeve.

25 Claims, 7 Drawing Sheets

CHAIN WHEEL ASSEMBLY AND CHAIN WHEEL DEVICE USING IT

BACKGROUND OF THE INVENTION

1. Field of the Invention

The present invention relates to chain wheels, and more particularly, to a chain wheel assembly and a chain wheel device using it, which is installed on a wheel hub of a back wheel of a bicycle.

2. Description of the Related Art

A conventional wheel hub of a back wheel of a bicycle is provided with plural chain wheels with different diameter sizes, which are optionally engaged by a chain through a derailleur, whereby chain wheels with multiple gear ratios are applied on the bicycle.

DE102012006771.2 discloses a pinion assembly 12, which is provided with plural chain wheels $14_1$ to $14_{10}$ with different diameters and numbers of sprockets, wherein the chain wheel $14_{10}$ with the largest diameter engages one end of an impeller 16, and other chain wheels $14_1$ to $14_6$ with smaller diameters engage the positions where an outer thread 22 being screwed by an inner thread 30 and the position where the impeller 16 is axially positioned at.

However, as shown by the drawings of DE102012006771.2, the chain wheels $14_1$ to $14_{10}$ are integrally formed. Compared with other chain wheels formed by plural single-piece board materials, cost of manufacturing is high; furthermore, such a component lacks the advantage of being lightweight.

SUMMARY OF THE INVENTION

For improving the aforementioned disadvantages, the present invention discloses a chain wheel assembly and a chain wheel device using it, wherein a chain wheel assembly is formed by plural chain wheels stacked up. Each of the chain wheels is made of a board material for lowering the cost of manufacturing. Furthermore, a connector is disposed between two neighboring chain wheels for transmitting an exerted torque from one chain wheel to the neighboring chain wheel, whereby the force exerted thereon is scattered.

For achieving such objectives, the present invention provides a chain wheel assembly, which is installed on an installation assembly, while the installation assembly is disposed on a wheel hub of a back wheel of a bicycle, whereby the chain wheel assembly engages a chain, wherein the chain wheel assembly comprises:

plural chain wheels with different diameter sizes, axially stacked from the largest one to the smallest one and disposed on the installation assembly, with plural sprockets disposed on the periphery of each of the chain wheels for optionally engaging the chain; and plural connectors, formed in a ring shape and coupled between each two of the chain wheels, respectively.

For achieving the objectives above, the present invention also provides a chain wheel device which is installed on a back wheel of a bicycle, comprising:

a driver, connected to a wheel hub of a back wheel of a bicycle for transmitting a torque;

a switching sleeve, with one end screwed to the driver;

plural chain wheels with different diameter sizes, axially stacked from the largest one to the smallest one in a direction from the driver to the switching sleeve, and having plural sprockets disposed on the periphery of each of the chain wheels for optionally engaging a chain;

plural connectors, formed in a ring shape and coupled between each two of the chain wheels, respectively; and a fastener, screwed to the other end of the switching sleeve for axially fixing the switching sleeve.

Preferably, each of the connectors of the present invention is made of a metal strip coiled up.

Preferably, the connectors of the present invention, arranged from the largest one to the smallest one, are disposed between two neighboring chain wheels, respectively.

Preferably, each of the chain wheels of the present invention is provided with plural coupling bores, while two sides of each of the connectors are engaged with the coupling bores, respectively, wherein each of the coupling bores is a through hole, and more preferably a round bore.

Preferably, two sides of each of the connectors are convexly and equidistantly provided with plural engaging blocks, respectively, for engaging the coupling bores.

Preferably, two sides of each of the engaging blocks are symmetrically formed, while each engaging block is in a rectangular shape, and the long edges of the engaging block are disposed in accordance with the rotational direction of the chain wheels.

Preferably, the chain wheels from the second largest chain wheel to the second smallest chain wheel are engaged with neighboring chain wheels on the two sides through two connectors.

The chain wheel assembly, instead of being integrally formed, is formed by plural chain wheels which are made of single-piece board materials, respectively, thus lowering the cost of manufacturing. Furthermore, each of the connectors is formed in a ring shape and coupled between two neighboring chain wheels; as a result, the torque exerted on each chain wheel is scattered by the chain wheels coupled together, thereby enhancing the torque tolerance of the chain wheel assembly.

DETAILED DESCRIPTION OF THE INVENTION

The aforementioned and further advantages and features of the present invention will be understood by reference to the description of the preferred embodiment in conjunction with the accompanying drawings.

Figure 1:
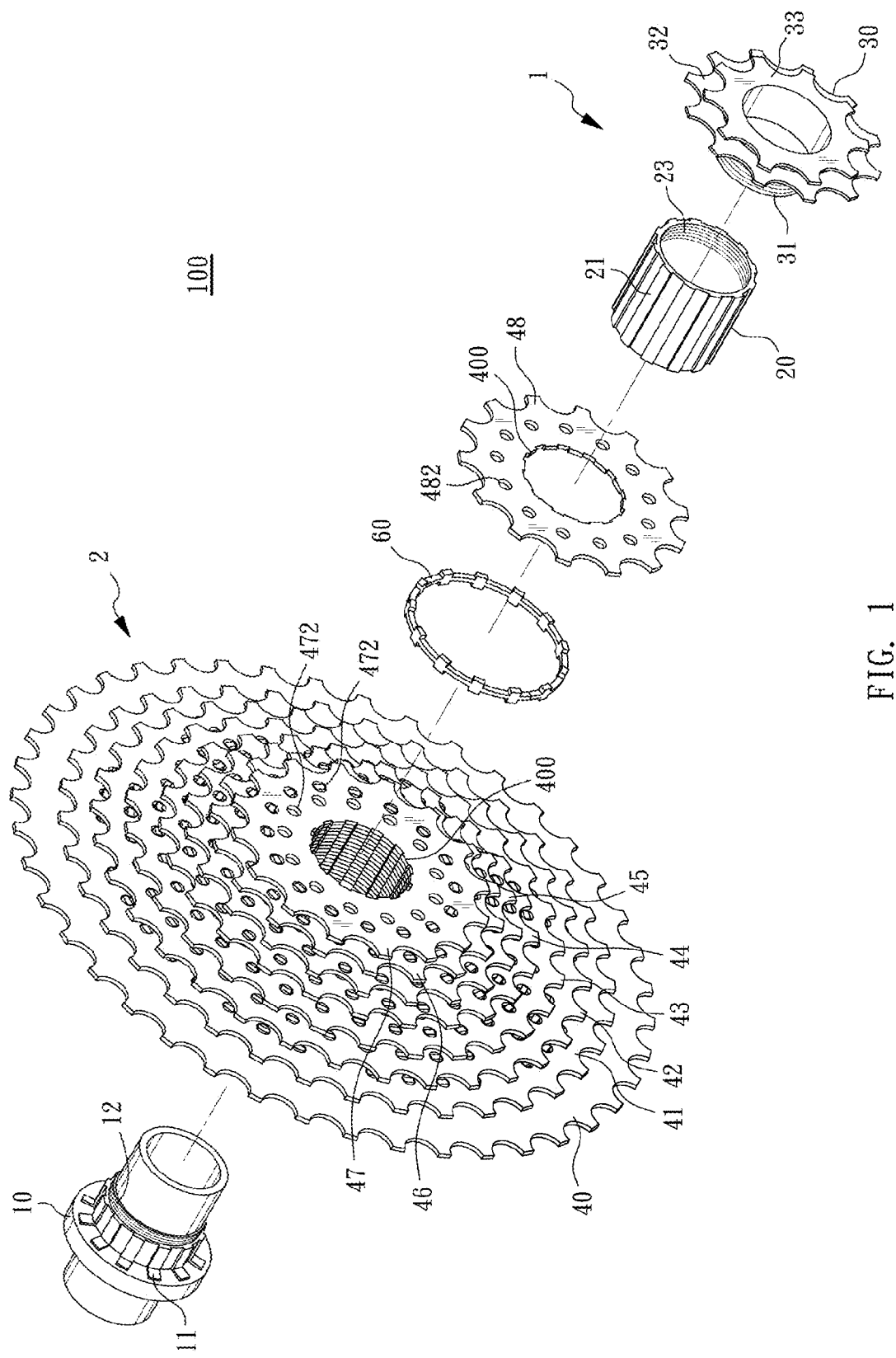
FIG. 1 is an exploded view of a chain wheel device in accordance with the present invention.
Figure 2:
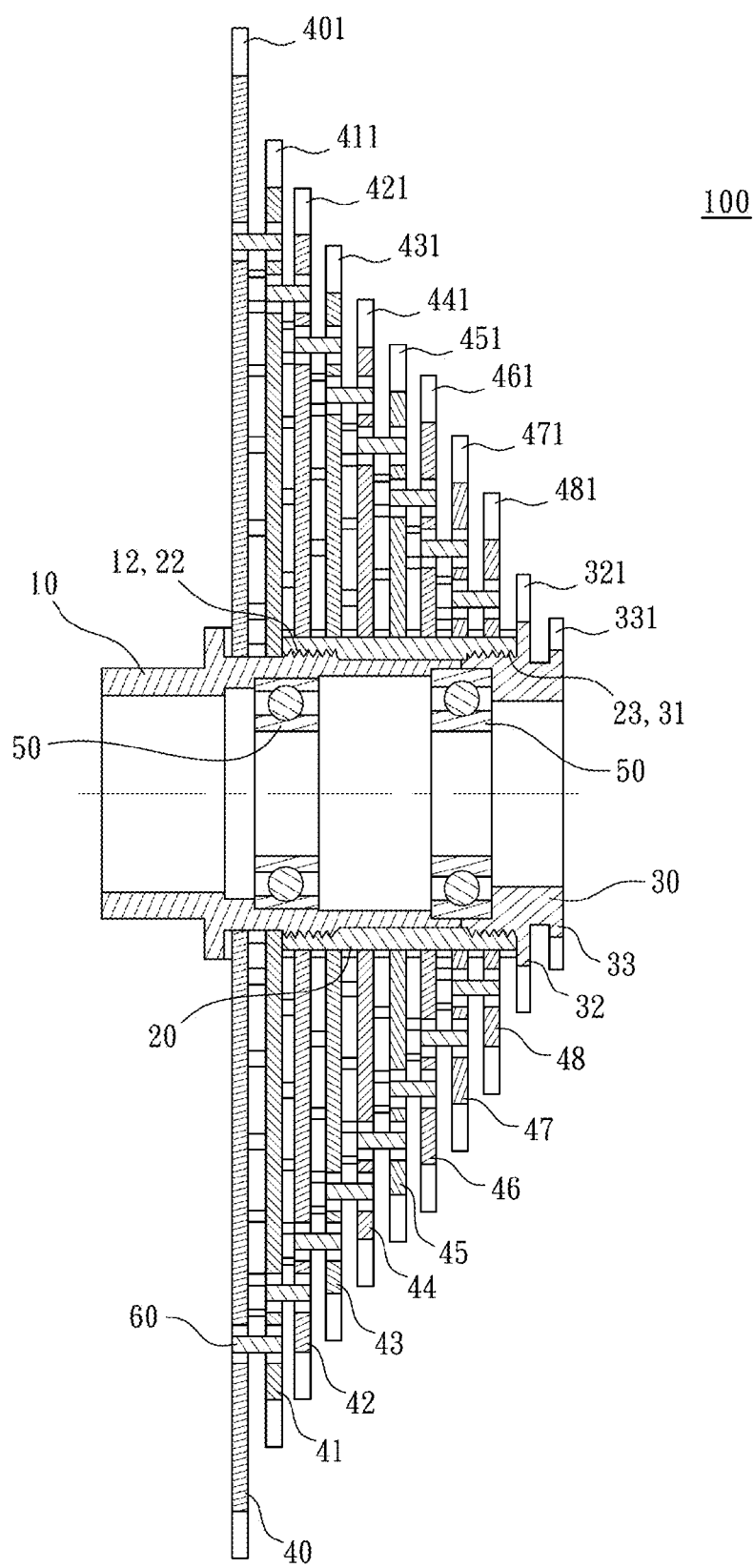
FIG. 2 is a sectional view of the chain wheel device in accordance with the present invention.
Figure 3:
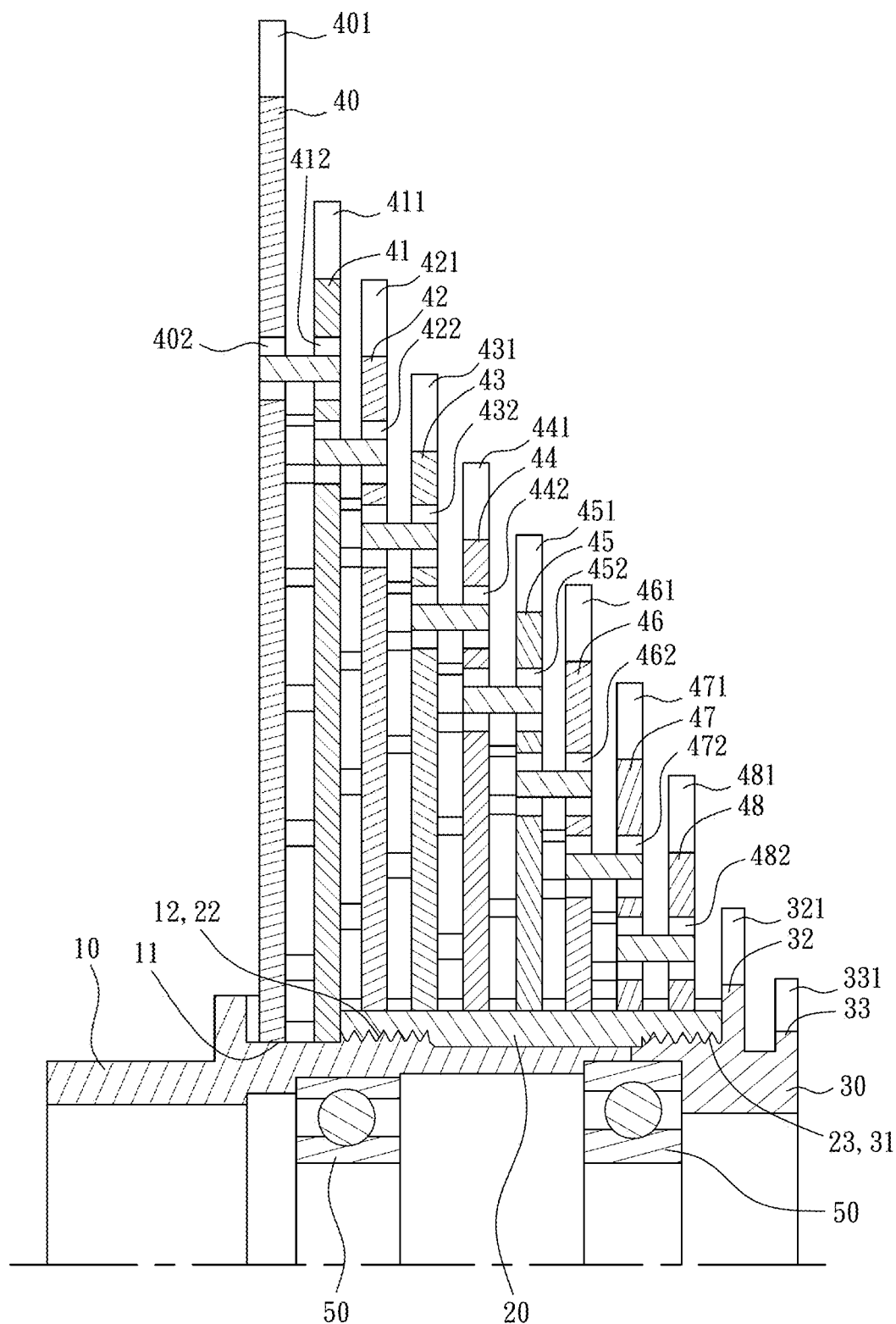
FIG. 3 is an enlarged view of the chain wheel device in FIG. 2.

Referring to FIG. 1 to FIG. 3, a chain wheel device 100 provided by the present invention is an 11-speed derailleur system capable of providing a better kinetic energy transmission, comprising an installation assembly 1 and a chain wheel assembly 2. The chain wheel assembly 2 is disposed on the installation assembly 1, while the installation assembly 1 is installed on a wheel hub of a back wheel of a bicycle, thereby enabling the chain wheel assembly 2 to optionally engage a chain. Therein, the installation assembly 1 comprises a driver 10, a switching sleeve 20, and a fastener 30, while the chain wheel assembly 2 is formed by plural chain wheels 40, 41, 42, 43, 44, 45, 46, 47, 48 with different diameter sizes and plural connectors 60.

Figure 5:
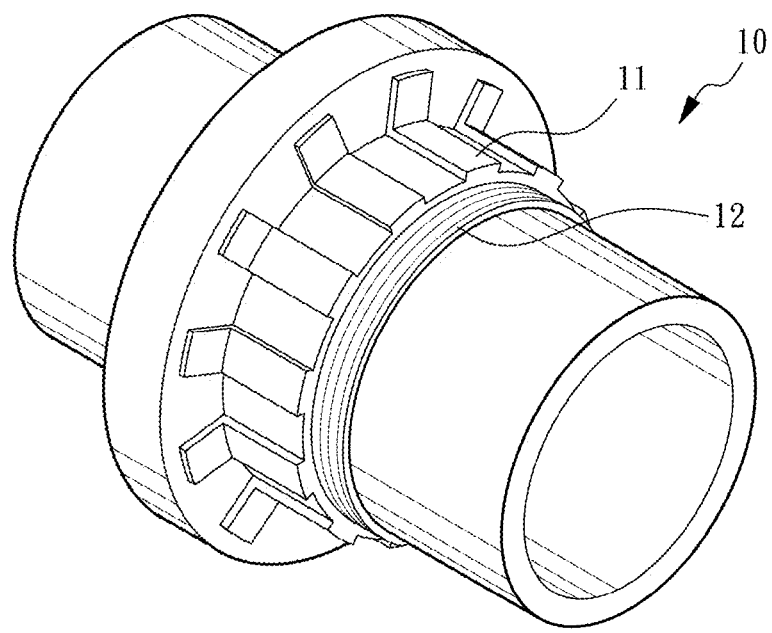
FIG. 5 is a perspective view of a driver in accordance with the present invention.

The driver 10, in a barrel shape as shown in FIG. 5, is a known component. A first spline 11 is disposed on the periphery of the driver 10, and a first outer thread 12 is disposed on one side of the first spline 11. The driver 10 is connected to a wheel hub of a back wheel of a bicycle for transmitting a torque. Therein, two bearings 50 are disposed inside the driver 10 for supporting and positioning the driver 10 on the wheel axle of the back wheel of the bicycle.

Figure 6:
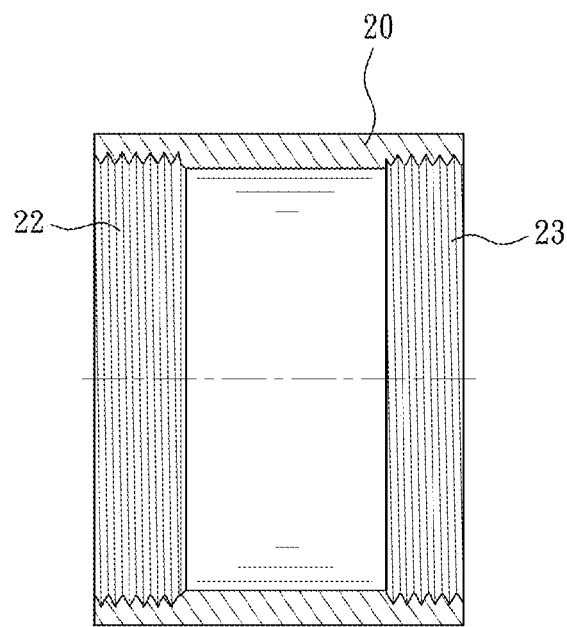
FIG. 6 is a sectional view of a switching sleeve in accordance with the present invention.

A second spline 21 is disposed on the periphery of the switching sleeve 20. In addition, two ends of the switching sleeve 20 are provided with a first inner thread 22 and a second inner thread 23, respectively. Furthermore, as shown in FIG. 6, the first inner thread 22 of the switching sleeve 20 is screwed to the first outer thread 12.

Figure 7:
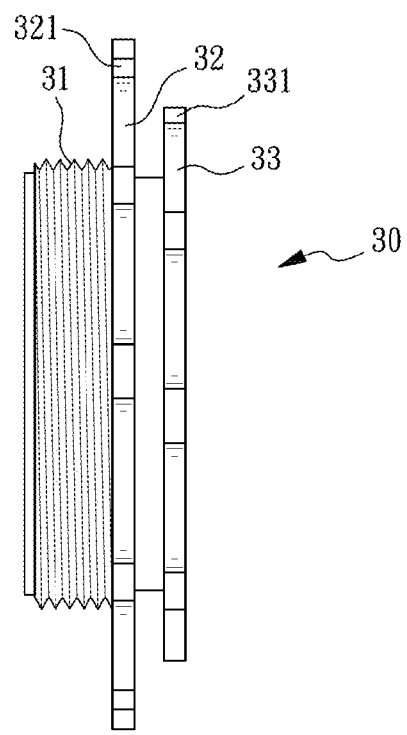
FIG. 7 is a side view of a fastener in accordance with the present invention.

As shown in FIG. 7, the fastener 30 is provided with a second outer thread 31 for being screwed to the second inner thread 23 of the switching sleeve 20, thereby axially fixing the switching sleeve 20. Also, two small diameter chain wheels 32, 33 are disposed on the periphery of the fastener 30, wherein the diameter of the small diameter chain wheel 33 is smaller than the diameter of the small diameter chain wheel 32, while plural sprockets 321, 331 are disposed on the periphery of the small diameter chain wheels 32, 33, respectively.

Figure 4:
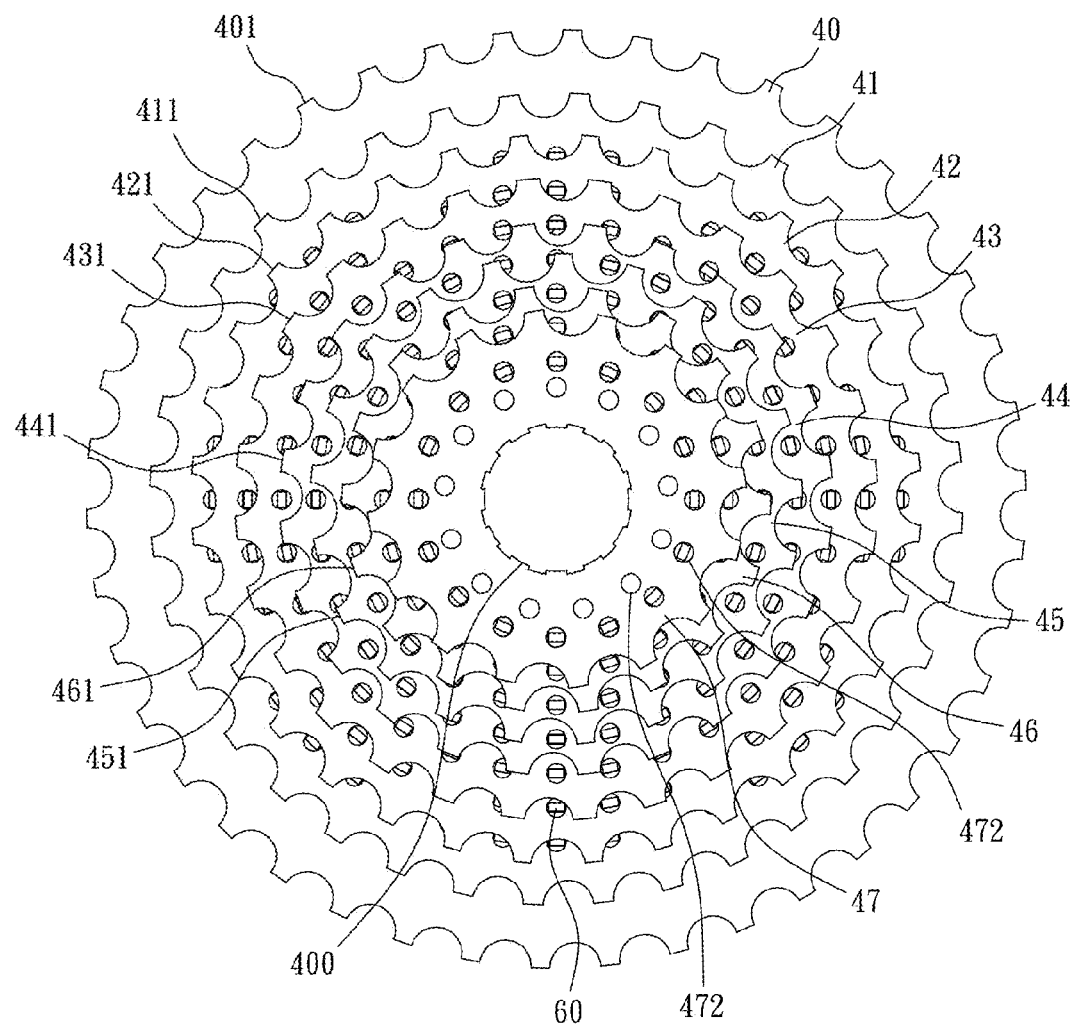
FIG. 4 is a side view of the chain wheel assembly in accordance with the present invention, excluding the chain wheel with the smallest diameter.

As shown in FIG. 2 to FIG. 4, the chain wheels 40 to 48 are axially stacked from the largest one to the smallest one and disposed on the installation assembly 1. Preferably, the chain wheels 40 to 48 are axially stacked from the largest one to the smallest one and disposed in a direction from the driver 10 to the switching sleeve 20, wherein the diameter of the chain wheel 40 is the largest, and the diameter of the chain wheel 48 is the smallest, while the chain wheel 48 is on the side adjacent to the small diameter chain wheels 32, 33 of the fastener 30. Also, the diameter of the small diameter chain wheels 32, 33 is smaller than the diameter of the chain wheel 48. In the embedment provided by the present invention, the chain wheels 40 to 48 are made of plural single-piece board materials, respectively. An engaging bore 400 with a convex and concave edged periphery is disposed at the center of the chain wheels 40 to 48, respectively, whereby the chain wheels 40, 41 with the largest and the second largest diameter sizes are engaged with the first spline 11 of the driver 10, while the chain wheels 42 to 48 are orderly engaged with the second spline 21 of the switching sleeve 20.

The peripheries of the chain wheels 40 to 48 are provided with plural sprockets 401 to 408, respectively, for optionally engaging the chain. Also, the chain wheels 40 to 48 are provided with plural coupling bores 402 to 482, respectively, which are arranged in a circle shape. The coupling bores 402 to 482, in the embodiment of the present invention, are plural round bores and further present as plural through holes. Especially, except for the chain wheel 40 and the chain wheel 48 having the largest and the smallest diameter sizes, chain wheels 41 to 47 are provided with two circles of the coupling bores 412 to 472.

Figure 8A:
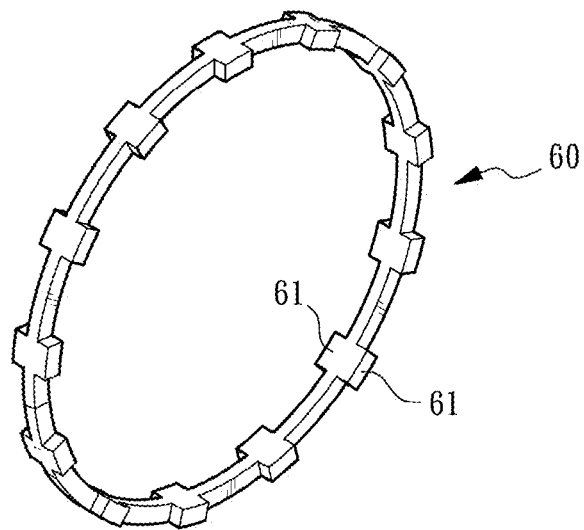
FIG. 8A is a perspective view of a connector in accordance with the present invention.
Figure 8B:
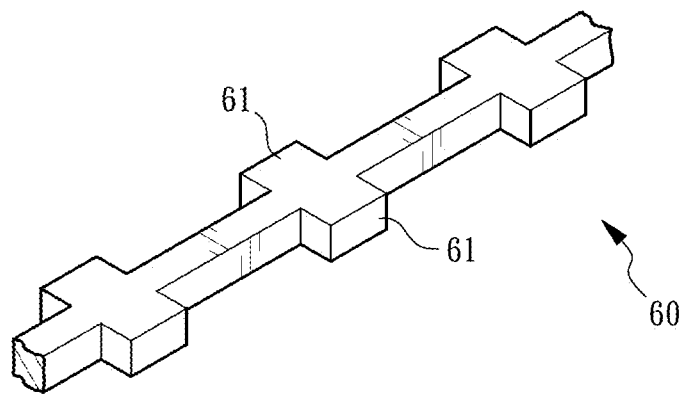
FIG. 8B is a perspective view of the connector which is not yet coiled in accordance with the present invention.

As shown in FIG. 8A and FIG. 8B, each of the connectors 60 is made of a continuous metal strip, which is, in the embodiment of the present invention, cut by use of wire electrical discharging machine. Two ends of the connector 60 are welded to be connected. The connectors 60 in a ring shape and having different diameter sizes, arranged from the largest ring to the smallest ring, are disposed between two neighboring chain wheels selected from the chain wheels 40 to 48, respectively. Therein, each of the connectors 60 is equidistantly provided with plural engaging blocks 61 for engaging the coupling bores 402 to 482, while two sides of each of the engaging blocks 61 are symmetrically formed, with the long edges thereof disposed in accordance with the rotational direction of the chain wheels 40 to 48. Therefore, the engaging blocks 61 have greater structural strength for bearing a torque. In addition, regarding the chain wheels 42 to 47, the respectively larger circle of the coupling bores 412 to 472 on each of the chain wheels 42 to 47 are adjacently disposed in axial alignment with the smaller circle of the coupling bores 412 to 462 of the neighboring chain wheels 41 to 46 with larger diameter sizes, respectively; beside, the larger circle of the coupling bores 412 on the chain wheel 41 is adjacently disposed in axial alignment with the only one circle of the coupling bores 402 on the chain wheel 40, and the smaller circle of the coupling bores 472 on the chain wheel 47 is adjacently disposed in axial alignment with the only one circle of the coupling bores 482 on the chain wheel 48. Therefore, plural connectors 60 are applied for engaging the neighboring coupling bores 402 to 482. Accordingly, orderly from the chain wheel 41, which has the second largest diameter size, to the chain wheel 47, which has the second smallest diameter size, two connectors 60 are disposed on the chain wheels 41 to 47, respectively, to engage and position the neighboring chain wheels 40 to 48.

To sum up, the chain wheel assembly 2, rather than integrally formed, is formed by plural chain wheels 40 to 48, which are made of a single-piece board material, respectively, whereby the cost of manufacturing is lowered. Furthermore, a connector 60, formed in a ring shape, is disposed between each two neighboring chain wheels selected from the chain wheels 40 to 48, respectively, in order to engage the two neighboring chain wheels 40 to 48, whereby a torque exerted on each of the chain wheels 40 to 48 is scattered by the coupled neighboring chain wheel, thus enhancing the torque tolerance of the chain wheel assembly Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A chain wheel assembly installed on an installation assembly disposed on a wheel hub of a back wheel of a bicycle, whereby the chain wheel assembly engages a chain, wherein the chain wheel assembly comprises:

plural chain wheels with different diameter sizes, axially stacked from the largest one to the smallest one and disposed on the installation assembly, with plural sprockets disposed on the periphery of each of the chain wheels for optionally engaging the chain; and plural connectors, formed in a ring shape and coupled between each two of the chain wheels, respectively.

2. The chain wheel assembly of claim 1, wherein each of the connectors is made of a metal strip coiled up.

3. The chain wheel assembly of claim 1, wherein the connectors are arranged from the largest ring to the smallest ring and disposed between two of the neighboring chain wheels, respectively.

4. The chain wheel assembly of claim 1, wherein each of the chain wheels is provided with plural coupling bores, while two sides of each of the connectors are engaged with the coupling bores, respectively.

5. The chain wheel assembly of claim 4, wherein each of the coupling bores is a through hole.

6. The chain wheel assembly of claim 4, wherein two sides of each of the connectors are equidistantly provided with plural engaging blocks, respectively, for engaging the coupling bores.

7. The chain wheel assembly of claim 6, wherein two sides of the engaging block are symmetrically formed.

8. The chain wheel assembly of claim 6, wherein each of the engaging blocks is in a rectangular shape, and each of the coupling bores is a round bore.

9. The chain wheel assembly of claim 8, wherein long edges of the engaging block are disposed in accordance with the rotational direction of the chain wheels.

10. The chain wheel assembly of claim 1, wherein the chain wheels arranged orderly from the chain wheel with the second largest diameter size to the chain wheel with the second smallest diameter size are engaged with two of the neighboring chain wheels on two sides of each of the chain wheels through two connectors.

11. A chain wheel device which is installed on a back wheel of a bicycle, comprising:
 a driver, connected to a wheel hub of a back wheel of a bicycle for transmitting a torque;
 a switching sleeve, with one end screwed to the driver;
 plural chain wheels with different diameter sizes, axially stacked from the largest one to the smallest one in a direction from the driver to the switching sleeve, and having plural sprockets disposed on the periphery of each of the chain wheels for optionally engaging a chain;
 plural connectors, formed in a ring shape and coupled between each two of the chain wheels, respectively; and
 a fastener, screwed to the other end of the switching sleeve for axially fixing the switching sleeve.

12. The chain wheel device of claim 11, wherein a first spline is disposed on the periphery of the driver for engaging the chain wheel with the largest diameter size and the chain wheel with the second largest diameter size.

13. The chain wheel device of claim 12, wherein one side of the first spline is provided with a first outer thread, while two ends of the switching sleeve are provided with a first inner thread and a second inner thread, respectively, with the first inner thread screwed to the first outer thread.

14. The chain wheel device of claim 13, wherein the fastener is provided with a second outer thread screwed to the second inner thread of the switching sleeve.

15. The chain wheel device of claim 12, wherein a second spline is disposed on the periphery of the switching sleeve for engaging the chain wheels except the chain wheel with the largest diameter size and the chain wheel with the second largest diameter size.

16. The chain wheel device of claim 11, wherein two small diameter chain wheels are disposed on the periphery of the fastener, while the diameters of the two small diameter chain wheels are smaller than the smallest outer diameters of the other chain wheels.

17. The chain wheel device of claim 11, wherein each of the connectors is made of a strip coiled up.

18. The chain wheel device of claim 11, wherein the connectors are arranged from the largest one to the smallest one and disposed between each two of the neighboring chain wheels, respectively.

19. The chain wheel device of claim 11, wherein each of the chain wheels is provided with plural coupling bores, while two sides of each of the connectors are engaged with the coupling bores, respectively.

20. The chain wheel device of claim 19, wherein each of the couplings bores is a through hole.

21. The chain wheel device of claim 19, wherein two sides of each of the connectors are equidistantly provided with plural engaging blocks, respectively, for engaging the coupling bores.

22. The chain wheel device of claim 21, wherein two sides of the engaging block are symmetrically formed.

23. The chain wheel device of claim 21, wherein the engaging block is in a rectangular shape, and each of the coupling bores is a round bore.

24. The chain wheel device of claim 23, wherein long edges of the engaging block are disposed in accordance with the rotational direction of the chain wheels.

25. The chain wheel assembly of claim 11, wherein the chain wheels arranged orderly from the chain wheel with the second largest diameter size to the chain wheel with the second smallest diameter size are engaged with two of the neighboring chain wheels on two sides of each of the chain wheels through two connectors.

* * * * *